(12) United States Patent
Laniepce et al.

(10) Patent No.: US 7,251,731 B2
(45) Date of Patent: Jul. 31, 2007

(54) CALL SET-UP FROM A MOBILE RADIO TELEPHONE TERMINAL WITH BIOMETRIC AUTHENTICATION

(75) Inventors: Sylvie Laniepce, Le Beny Bocage (FR); Didier Guerin, Caen (FR)

(73) Assignee: France Telecom, Paris (FR)

( * ) Notice: Subject to any disclaimer, the term of this patent is extended or adjusted under 35 U.S.C. 154(b) by 778 days.

(21) Appl. No.: 10/399,764

(22) PCT Filed: Nov. 16, 2001

(86) PCT No.: PCT/FR01/03594

§ 371 (c)(1),
(2), (4) Date: Apr. 22, 2003

(87) PCT Pub. No.: WO02/43355

PCT Pub. Date: May 30, 2002

(65) Prior Publication Data

US 2004/0059915 A1    Mar. 25, 2004

(30) Foreign Application Priority Data

Nov. 22, 2000  (FR) ................................. 00 15161

(51) Int. Cl.
*H04L 9/00* (2006.01)

(52) U.S. Cl. ...................... 713/176; 380/247; 380/270; 340/5.5; 340/5.8

(58) Field of Classification Search ................ 713/176, 713/186; 380/247, 270; 340/5.83, 5.81, 340/5.8, 5.5
See application file for complete search history.

(56) References Cited

U.S. PATENT DOCUMENTS

| | | | |
|---|---|---|---|
| 5,661,806 A | 8/1997 | Nevoux et al. | |
| 5,991,623 A * | 11/1999 | Ohta et al. | ............... 455/435.1 |
| 6,084,968 A | 7/2000 | Kennedy et al. | |
| 6,657,538 B1 * | 12/2003 | Ritter | ......................... 340/5.81 |
| 6,819,219 B1 * | 11/2004 | Bolle et al. | ................. 340/5.52 |

FOREIGN PATENT DOCUMENTS

| | | |
|---|---|---|
| DE | 196 53 712 A | 6/1998 |
| GB | 2 222 288 A | 2/1990 |

* cited by examiner

*Primary Examiner*—Kambiz Zand
*Assistant Examiner*—Ellen C. Tran
(74) *Attorney, Agent, or Firm*—Lowe Hauptman & Berner LLP (57) ABSTRACT

To set up a call coming from a user's mobile radio telephone terminal to a receiver terminal for example a home automation terminal, the result of a biometric authentication of the user in the mobile terminal and of a predetermined result are applied to algorithms for authenticating of the mobile terminal implemented in the mobile terminal and fixed storage arrangement in the radio telephone network. If the signature produced by the algorithm in the mobile terminal and transmitted by it and the signature result produced by the algorithm in the fixed storage arrangement are identical, an identifier of the mobile terminal is transmitted from the fixed storage arrangement to the called receiver terminal. The outgoing call is accepted by the receiver terminal only when the latter has recognized the transmitted identifier, or in a variant an identifier of removable supplementary card included in the mobile terminal.

18 Claims, 6 Drawing Sheets

CALL SET-UP FROM A MOBILE RADIO TELEPHONE TERMINAL WITH BIOMETRIC AUTHENTICATION

REFERENCE TO RELATED APPLICATION

This application is a PCT International Application No. PCT/FR01/03594 filed Nov. 16, 2001, which is a continuation of the French Application No. 00-15161 filed Nov. 22, 2000.

BACKGROUND OF THE INVENTION

1. Field of the Invention

The present invention relates to the set-up of an outgoing call from a mobile radio telephone terminal equipped with a biometric sensor to a receiver terminal, the call set-up entailing an authentication of the terminal sending commands before executing commands sent by the mobile terminal.

2. Description of the Prior Art

In mobile radio telephone terminals incorporating a biometric sensor, generally a fingerprint sensor, the biometric print of the user who is the proprietor of the terminal recognized by the sensor is used to activate the functional means connected to the keypad of the terminal, instead of a personal identification number (PIN) pre-stored in the removable subscriber identity module (SIM) card included in the terminal. In other terminals, the biometric sensor is connected to a key that is used very often, such as a navigator or cursor key.

The biometric sensor authorizes use of the mobile terminal only by the proprietor user or by users authorized by the latter if the SIM card is able to recognize their biometric prints.

Also, biometric recognition sensors are increasingly being incorporated into equipments such as data processing equipments, and in particular telecommunication equipments. The biometric characteristics of users, known as their biometric references, are stored in these equipments during a preliminary phase, called as an enrolment phase. This results in the biometric references being stored simultaneously in a multitude of places. As the biometric reference is a data personal to the user, this dispersion thereof compromises the confidentiality thereof and causes the user to consider carefully what might become of this data. In fact the user may worry about the possibility of theft, loss or abuse of this data.

Biometric authentication techniques really identify a person since they use what the person "is", for example their fingerprint, rather than merely something that the person possesses, such as a badge, or knows, such as a secret code. However, biometric authentication techniques are statistical procedures and are subject to two main recognition error rates: a false rejected rate (FRR), when a person whose biometric characteristic has been stored is not recognized, and a false accepted rate (FAR), when a person offering a "usurped" biometric characteristic is recognized.

These intrinsic imperfections of biometrics allow anyone to "take a chance" on defrauding an access control system. For example, a person in the street might simply place his finger on the fingerprint sensor incorporated into the door of an automobile. The system is defrauded if that person happens to fall within the range represented by the FAR.

Thus biometric authentication alone cannot guarantee that a user whose biometric print has been recognized is authorized to access a service or execute a command.

The invention also relies on authenticating a mobile radio telephone terminal by a cryptographic process implemented between the SIM identity card and fixed storage means of the radio telephone network through which the terminal communicates. This authentication can only authenticate the mobile terminal remotely, and not its user. In fact, using the SIM identity card ensures that the mobile terminal user knows the PIN stored in the SIM card or is recognized biometrically by the card, but this does not guarantee to the network that the service has been requested by the authorized user.

If the PIN code or the biometric sensor is deactivated, in particular for practical or ergonomic reasons, there is then no procedure for identifying the user. In other words, there is no link between identification of the user by the SIM card and authentication of the mobile terminal by the network.

OBJECT OF THE INVENTION

The present invention aims to remedy the dispersion of the biometric reference of each user in favor of a single storage location that is private and personal to the user. To be more precise, the object of the invention is to use the mobile terminal of a user as a private and personal means for storing his biometric reference, in order to combine it with authentication of the terminal by the network or by a called terminal intimately related to the user of the calling mobile terminal.

SUMMARY OF THE INVENTION

Accordingly, a method of setting up an outgoing call from a mobile terminal of a user in a radio telephone network to a second terminal, including authentication of the mobile terminal by fixed storage means in the radio telephone network and a call from the fixed means to the second terminal, is characterized in that it includes application of the result of biometric authentication of the user in the mobile terminal and of a predetermined result respectively to identical algorithms for authenticating the mobile terminal respectively implemented in the mobile terminal and the fixed means, comparison in the fixed means of a signature produced by the algorithm in the mobile terminal and transmitted by the latter and a signature result produced by the algorithm in the fixed means, transmission of an identifier of the mobile terminal from the fixed means to the called second terminal only if the signature and the result compared are identical, and identification of the mobile terminal by the second terminal in order for the second terminal to accept the outgoing call only when the second terminal has recognized the identifier transmitted.

Thus the invention combines a plurality of mechanisms that until now have been separate:

- biometric authentication of the user in the mobile terminal;
- authentication of the mobile terminal, i.e. in practice authentication of the SIM card contained in the mobile terminal, by intermediary means participating in the outgoing call from the mobile terminal ; the intermediary means can be fixed means of the radio telephone network or, in another embodiment, the called second terminal itself; and
- optional authentication of the intermediary means participating in the call, by the second terminal.

To circumvent the above combination, the user must firstly fall within the range corresponding to the FAR of the mobile terminal and secondly be using the mobile terminal specifically recognized by the intermediary means.

The transmission of the identifier is preferably secured by cryptography algorithms which use asymmetric keys and which are implemented in the fixed means and the receiver terminal and which depend on a random variable transmitted from either one of the fixed means and the second terminal to the other, or generated in the fixed means and the second terminal, for example by clocks. As an alternative to this, security is obtained by symmetrical key cryptographic algorithms, for example one-way hashings.

According to another embodiment, access rights are handed over to a user owing to an additional card delivered by the user. The transmission of the identifier of the mobile terminal from the fixed means after the call to the second terminal is replaced by connection of the mobile terminal and the second terminal via the fixed means, verification of the presence of a removable additional card in the mobile terminal by the second terminal, and preferably secured transmission of an identifier of the additional card from the mobile terminal to the second terminal in order for the second terminal to identify the mobile terminal as a function of the card identifier transmitted. Preferably, access rights in the second terminal are modified only in response to an identifier of a predetermined terminal transmitted by the fixed means.

The invention also provides a mobile radio telephone terminal, fixed storage means in the radio telephone network, and a second terminal, for example a home automation command receiver terminal, for implementing the outgoing call set-up method in accordance with the invention.

The mobile radio telephone terminal of a user in a radio telephone network for implementing the method according to the invention for setting up an outgoing call, includes means for biometric authentication of the user, and is characterized by means for implementing an algorithm for authentication of the mobile terminal by the network to which a result of biometric authentication of the user, a pre-stored key, and a random number which is transmitted by the network are fed in order to transmit a signature to the fixed means.

The fixed storage means in a radio telephone network for implementing the method according to the invention for setting up an outgoing call from a mobile terminal of a user in the radio telephone network to a second terminal via the fixed means, are characterized by means for implementing an algorithm for authenticating the mobile terminal to which are fed a predetermined result depending on biometric authentication of the user, a pre-stored key, and a random number transmitted by the fixed means to the mobile terminal, in order to compare a signature transmitted by the mobile terminal to a signature result produced by the algorithm and to call the second terminal if the signature and the signature result are identical. The fixed storage means can include means for transmitting an identifier of the mobile terminal to the second terminal after calling it, that is to say if the signature and the result compared are identical. As an alternative to this, an additional card identity included in the mobile terminal, instead of the mobile terminal identifier, is transmitted to the second terminal.

The second terminal for implementing the method according to the invention for setting up an outgoing call from a mobile terminal of a user in a radio telephone network, is characterized by means for identifying the mobile terminal as a function of an identifier of the mobile terminal transmitted by fixed storage means in the radio telephone network or by means for identifying a removable additional card included in the mobile terminal as a function of an identifier of the card transmitted by the mobile terminal, after biometric authentication of the user in the mobile terminal and authentication of the mobile terminal by the fixed means, in order to accept the outgoing call only if the second terminal has recognized the identifier transmitted.

BRIEF DESCRIPTION OF THE DRAWINGS

Other features and advantages of the present invention will become more clearly apparent on reading the following description of preferred embodiments of the invention, which is given with reference to the corresponding accompanying drawings, in which.

DESCRIPTION OF THE PREFERRED EMBODIMENTS

Figure 1:
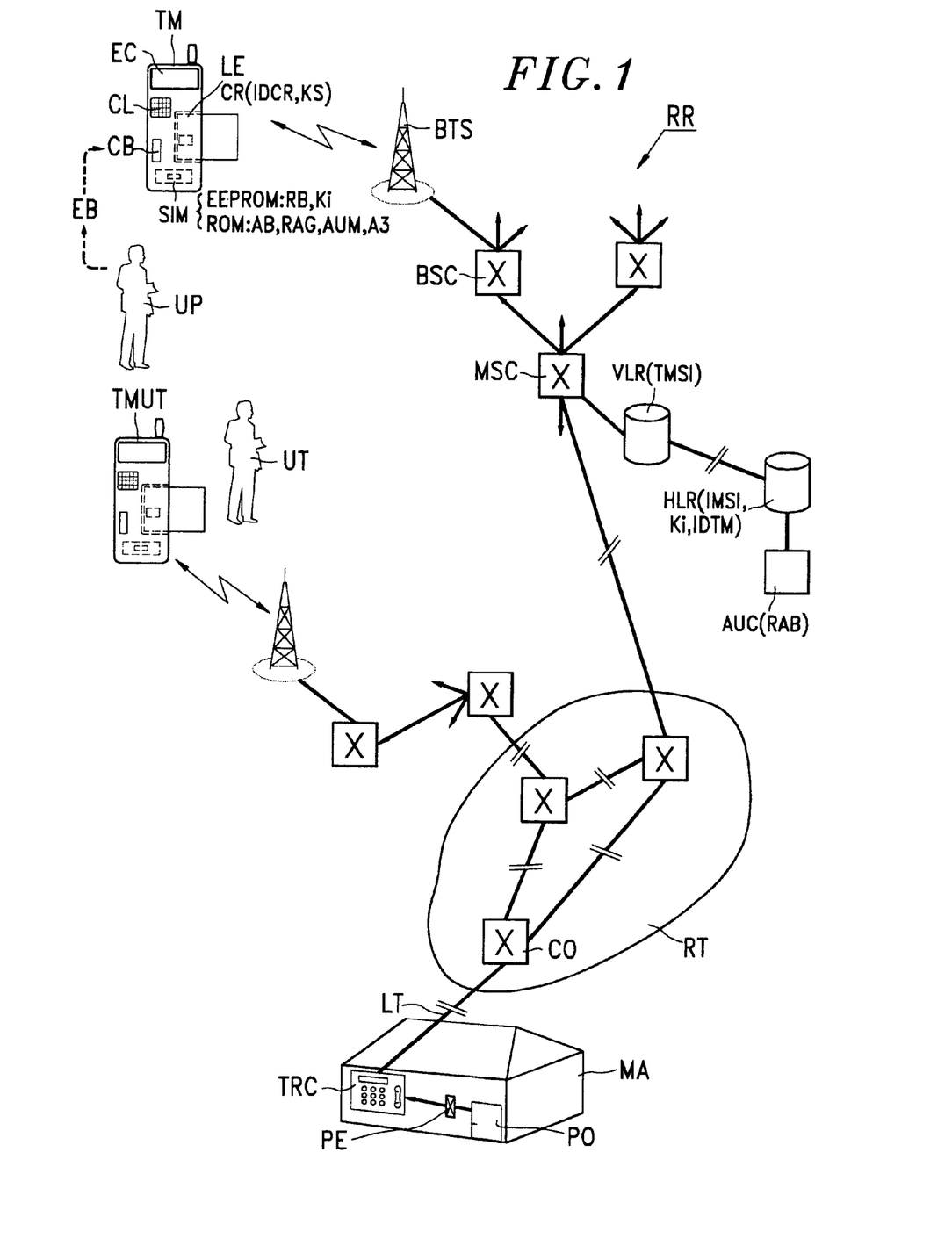
FIG. 1 is a block schematic of a telecommunication system implementing the authentication method according to the invention.

Referring to FIG. 1, a telecommunication system for implementing the authentication method according to the invention essentially comprises a mobile radio telephone terminal TM of a proprietor user UP, a cellular radio telephone network RR to which the user UP is subscribed, and a second terminal called as a command receiver terminal TRC.

By way of non-restrictive example, the system concerns a home automation application for remote access control through the intermediary of a home automation key telephone system constituting the receiver terminal TRC connected to the radio telephone network RR by a telecommunication line LT from a central office CO in a telecommunication network RT, such as the switched telephone network RTC. The receiver terminal TRC is connected by radio link and/or cable to various appliances and sensors, in particular an electronic doorkeeper PE for opening an entry door PO or an entrance gate or a garage door of the house MA of the proprietor user UP. As described in more detail below, the user UP in front of the doorkeeper PE has only access means in the form of a mobile terminal TM and a biometric print EB serving as a access means, i.e. as a key to command activation of the doorkeeper PE by means of a command COM transmitted to the receiver terminal TRC.

As an alternative to this, the receiver terminal TRC is a mobile terminal served by the network RR or by another radio telephone network. For example, the receiver terminal TRC is integrated into an automobile and controls the central door locking system thereof.

More generally, the network RT incorporates any telecommunication network including a switched telephone network RTC and a high bit rate network RHD such as the internet serving a plurality of receiver terminals installed in the home, in the automobile and at a workplace of the user UP.

The mobile terminal TM is a conventional self-contained mobile radio telephone set, for example of GSM 900, DCS 1800 or UMTS type, as referred to hereinafter, or any other private and personal mobile telecommunication tool or device, such as a personal digital assistant (PDA) or a portable microcomputer equipped with a radio telephone transceiver module. As is known in the art, the terminal TM includes a man-machine interface including a keypad CL and/or a voice dialog system, a screen EC, a microphone, a loudspeaker, and a biometric sensor CB. The sensor CB senses a biometric print EB of the user UP, which can be a fingerprint from one finger or more than one finger, a voice print, which can be combined with a predetermined confidential message, the pattern of the iris of the eye, a portion of the user's face, etc. The sensor CB is of a known type, for example based on image analysis and/or pressure and/or temperature, producing an electrical signal representative of the biometric print sensed.

The terminal TM also contains a removable microcontroller module, called as a subscriber identity module SIM card, connected to the man-machine interface of the terminal. In the microcontroller of the SIM card, a non-volatile EEPROM contains all the details of the user profile, in particular the international mobile subscriber identity IMSI of the user UP, the identity TMSI temporarily assigned to the user, an RR network subscription profile for the user, an international directory number for the user MSISDN (Mobile Station ISDN Number) used to call the terminal TM, a private directory of telephone numbers, in particular the number NTRC of the receiver terminal TRC, and security data such as an authentication key Ki.

Furthermore according to the invention, the EEPROM memory has pre-stored a digital biometric reference RB of the biometric print of the user UP for comparison with that produced by the sensor CB as a function of the sensed print EB.

A ROM read-only memory of the SIM card microcontroller contains the operating system of the card and various dedicated applications.

According to the invention, at least a biometric authentication algorithm AB, a user and mobile authentication algorithm AUM, and optionally an mobile authentication algorithm A3 are written essentially in the ROM and EEPROM memories.

The algorithm AUM, or the algorithms AUM and A3, replace a known authentication algorithm A3 in the GSM standard for authentication of the mobile terminal TM, i.e. the SIM card contained therein, by an authentication center AUC of the radio telephone network RR.

In a second embodiment, described much later, the mobile terminal TM includes an additional microchip card reader LE. An additional card CR personal to the proprietor user UP contains a personal card identifier IDCR in place of a mobile terminal identifier IDTM supplied by the network RR.

FIG. 1 also shows diagrammatically the main fixed means of the radio telephone network RR of the GSM type for example, connecting the mobile radio telephone terminal TM to the receiver terminal TRC at a given time. The main fixed means comprise a current base transceiver station BTS providing radio coverage in the current cell in which the mobile terminal TM is temporarily located, a base station controller BSC, and a mobile service switching center MSC. The switching center MSC is connected to a central office CO or equivalent means in the network RT and is associated with a visitor location register VLR. The register VLR manages a location area consisting of a few cells of the network RR and temporarily stores identities and profiles of users, i.e. of SIM cards, located in this area.

The radio telephone network RR also includes at least a home location register HLR connected to mobile service switching centers MSC via the signaling network of the radio telephone network RR. The register HLR consists mainly of a database storing for each of the predetermined mobile terminals, in this instance the terminal TM, the IMSI international identity of the proprietor user UP of the SIM card included in the terminal, the user's MSISDN number and the user's subscription profile, and the number of the register VLR temporarily serving the mobile terminal TM and updated at the time of handovers between location areas.

The register HLR is associated with an authentication center AUC for authenticating mobile terminals covered by cells served by the switching centers MSC that are connected to the register HLR. In particular, in accordance with the invention, the center AUC manages the authentication algorithm AUM and optionally the algorithm A3 and uses the authentication key Ki assigned only to the user UP designated by his IMSI identity and stored in the home location register HLR when the user UP first subscribed to the radio telephone network RR. The authentication center AU also includes a pseudorandom generator for generating random numbers RAND.

Figure 2:
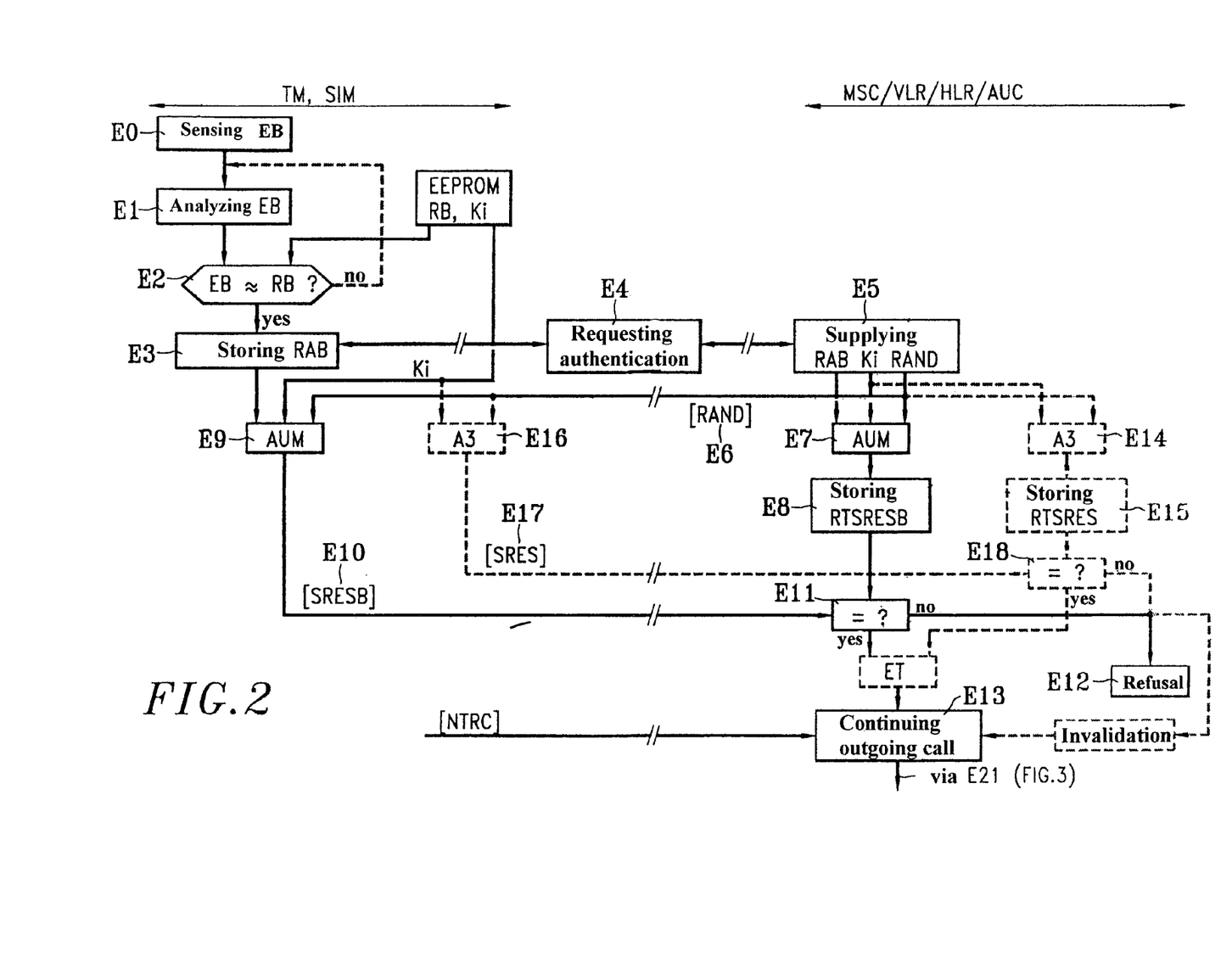
FIG. 2 is a user and mobile terminal authentication step algorithm used in accordance with the invention between a mobile terminal and a radio telephone network to set up an outgoing call to a command receiver terminal.
Figure 3:
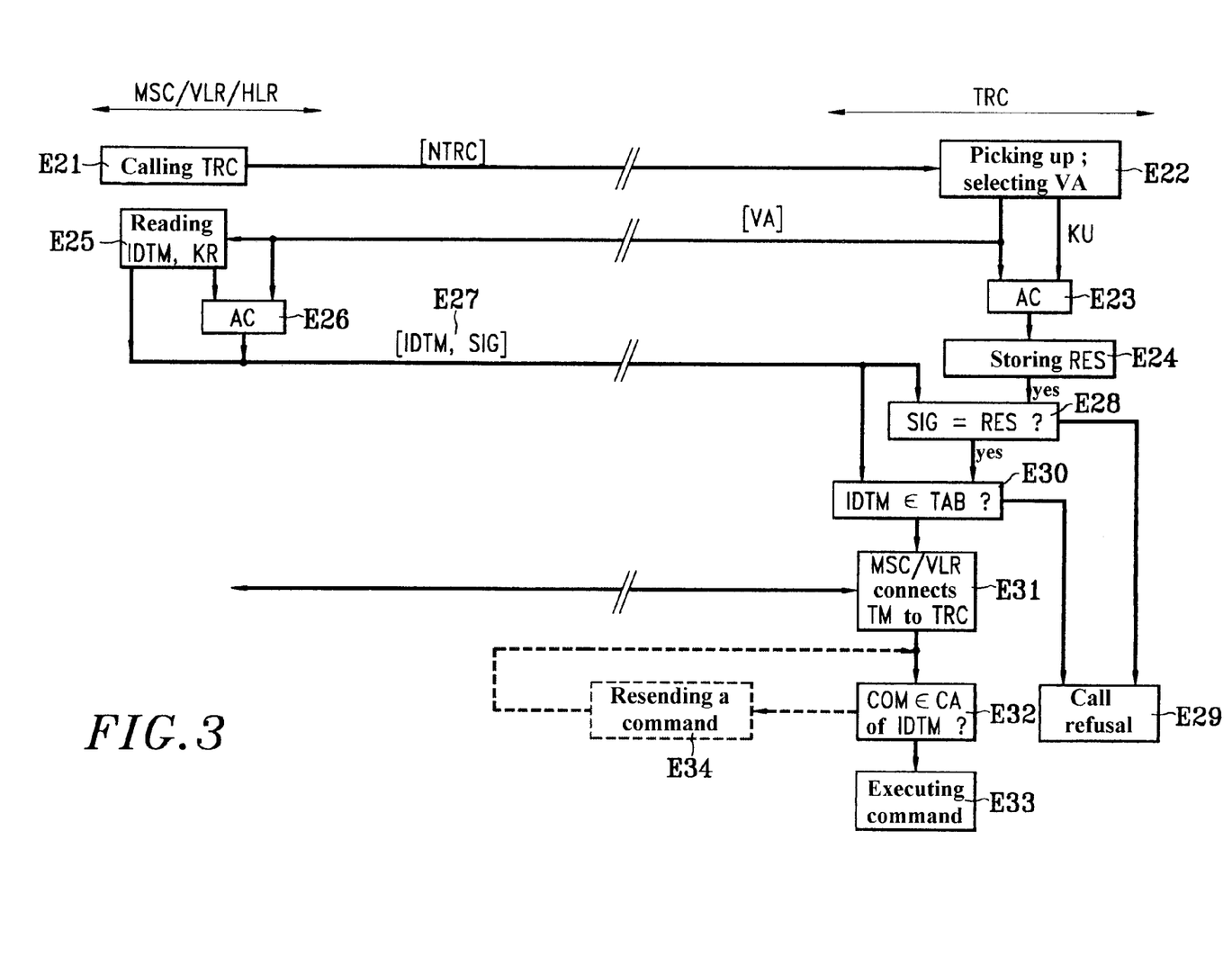
FIG. 3 is a step algorithm used in accordance with the invention to confirm authentication to the command receiver terminal.

In a first embodiment of the invention, the outgoing call set-up process comprises authentication steps E10 to E13 shown in FIG. 2 followed by secure authentication confirmation steps E21 to E33 shown in FIG. 3.

Initially, in step E0, the mobile radio telephone terminal TM containing the SIM card of the proprietor user UP is switched on by pressing the on/off key of the terminal, which displays on the screen EC a message prompting the proprietor user UP to offer up the biometric print EB to the biometric sensor CB. In step El, the sensor CB analyzes the print EB to extract physical characteristics and compare them to the biometric reference RB of the user UP stored in the EEPROM memory of the SIM card using the biometric authentication algorithm AB. The user UP is deemed to have been authenticated in step E2 if the similarity between the characteristics of the sensed print EB and the biometric reference RB is more than a predetermined threshold. A biometric authentication result RAB, such as a predetermined word, is then written into the EEPROM memory of the SIM card in step E3, and attests to successful biometric authentication of the user. The predetermined result RAB is also known to the authentication center AUC. Otherwise, authentication fails in step E2, and the subsequent authentication E5 to E13 for the mobile terminal TM by the fixed means VLR, HLR, AUC is not executed. The user is preferably prompted to offer his print EB to the sensor CB again, for example two or three times.

After step E3, if it has not already been done, the user UP enters or selects the number NTRC of the terminal TRC and confirms this action in order for the terminal TM to send a service request to the network RR and for the latter to request authentication of the mobile terminal. A similar request is also employed when updating the location of the roaming terminal TM following an intercellular handover. In FIG. 2, the service and authentication request is indicated schematically by a step E4 and involves the fixed means of the radio telephone network RR, to be more precise the visitor location register VLR, the home location register HLR, and the authentication center AUC.

As an alternative to the above, the biometric authentication is effected systematically prior to any outgoing call after entering or selecting the call number NTRC of the receiver terminal TRC in the mobile terminal. For example, the print EB is offered simply by placing a finger on a confirmation key, such as an off-hook key, equipped with the biometric sensor CB to confirm the call after entering or selecting the call number NTRC.

The "authentication request" in step E4 starts authentication of the mobile terminal TM by the authentication center AUC of the network RR in the next step E5. The pseudo-random generator in the center AUC produces a random number RAND having a predetermined length, or in a variant the register HLR selects one RAND of plural random numbers initially supplied by the center AUC to the register HLR, in association with the IMSI identity of the user UP when he first subscribed to the network. Accordingly, after step E5, the register HLR transmits the random number RAND to the terminal TM in step E6. At the same time, the number RAND, the authentication key Ki associated with the user UP, and the result RAB read by the center AUC are fed to the authentication algorithm AUM implemented in the center AUC. A signed biometric response result RTSRESB supplied by the algorithm AUM is stored in the registers HLR and VLR in step E8.

In the SIM card of the terminal TM, and in response to the random number RAND transmitted in step E6, the biometric authentication result RAB and the authentication key Ki are read in the EEPROM memory of the SIM card in order to be fed, with the received number RAND, to the authentication algorithm AUM in the SIM card in step E9. The algorithm AUM produces a biometric signed response SRESB which is transmitted by the SIM card to the register VLR via the terminal TM in step E10.

Finally, the register VLR reads the previously stored result RTSRESB and compares it to the received response SRESB in step E11. If the response SRESB is different from the result RTSRESB, the register VLR commands the switching center MSC to disconnect the terminal from the network in step E12, and in particular to refuse to set up a requested outgoing call, in this instance relating to the receiver terminal TRC.

In a variant of step E12 shown in dashed line in FIG. 2, the register VLR continues the call in the next step E13, transmitting an authentication invalidation to the receiver terminal TRC in a future step E27 (FIG. 3); the terminal TRC that has taken the call then handles the invalidation itself, for example by hanging up or by limiting the services offered.

On the other hand, for a result RTSRESB that is equal to the signed biometric response SRESB, the register VLR validates the biometric authentication of the user and the authentication of the mobile terminal and authorizes the switching center MSC to set up the requested outgoing call to the terminal TRC in step E13, in particular by exchanging encrypted messages between the terminal TM and the network RR. The signed response SRESB transmitted by the mobile terminal TM cannot be identical to a previous result of the authentication algorithm AUM transmitted again at the instigation of a malicious person since the random number RAND is different from one authentication to the next and is produced by the authentication center AUC of the network itself.

Accordingly, the authentication steps E5 to E13 are comparable to those already implemented in a GSM network terminal, which does not modify overall the exchanges between the terminal TM and the network RR. It will be noted that the result RAB participates in the execution of the algorithm AUM, on the same terms as the random number RAND and the key Ki, and is not merely a signal for triggering or not triggering the algorithm AUM.

In an optional variant shown in dashed line in FIG. 2, the call set-up process comprises additional steps E14 to E17, in parallel with and analogous to the authentication steps E7 to E11 depending on the result RAB of the biometric authentication, in order for the mobile terminal TM to be authenticated by the fixed storage means VLR, HLR, AUC of the network RR in a manner known, independently of the result RAB of biometric authentication E1-E2.

In parallel with steps E7 and E8, and after step E5, the authentication center AUC feeds the random number RAND and the key Ki to the authentication algorithm A3 as well, for authentication of the mobile TM by the network RR, and the registers HLR and VLR store a signed response result RTSRES produced by the algorithm A3 and delivered by the authentication center, in steps E14 and E15.

In step E16, in parallel with step E9, the key Ki read in the EEPROM memory of the SIM card and the random number RAND transmitted by the register HLR in step E6 are fed to the algorithm A3, which is also implemented in ROM memory in the SIM card. The algorithm A3 produces a signed response SRES transmitted by the SIM card to the register VLR in step E17.

The register VLR compares the stored result RTSRES and the received response SRES in step E18. If the response SRES is different from the result RTSRES or if, in step E11, the response SRESB transmitted in step E10 is different from the result RTSRESB read in step E8, the register VLR controls the associated switching center MSC to refuse the requested call in step E12, or continues the call by transmitting an authentication invalidation to the terminal TRC in the previously cited variant of step E12. On the other hand, if the results RTSRESB and RTSRES are identical to the received signed responses SRESB and SRES, respectively, in steps E11 and E18, the switching center MSC is authorized by the register VLR in step E13 to continue setting up the requested outgoing call. In particular, messages exchanged between the terminal TM and the fixed means of the network RR, such as at least the current base transceiver station BTS, are encrypted. The telephone number NTRC of the called terminal TRC entered or selected is transmitted by the terminal TM to the MSC/VLR combination and to the home location register HLR.

The network RR then confirms the authentication of the user UP and the authentication of the terminal TM to the command receiver terminal TRC by calling the latter via the network RT in the next step E21. As shown in FIG. 3, the confirmation of positive authentications of the user UP and the terminal TM by the network RR to the receiver terminal TRC is effected in the subsequent steps E22 to E34 by secure transmission of an identifier IDTM of the mobile terminal TM to the receiver terminal TRC. For example, the identifier IDTM is the MSISDN user's international number stored in the register HLR.

In response to the switching center MSC calling the terminal TRC via the telecommunication network RT, the called terminal TRC seizes the line LT, i.e. simulates an off-hook condition, and produces a random variable VA in order to transmit it to the register VLR associated with the switching center MSC in step E22. The terminal TRC also feeds the variable VA and a public key KU to a public key cryptography algorithm AC in step E23 and stores a result RES in step E24. The random variable VA is produced by a pseudorandom generator in the terminal TRC.

In a variant, the random variable VA is the time that the call E21 is received, for example to the nearest one hundredth of a second. In this variant, the variable VA is generated by a clock included in the terminal TRC and is not transmitted to the register VLR, which includes another clock which generates the variable VA immediately on transmission of the call E21, synchronously with the variable VA produced in the terminal TRC.

In the register VLR, in step E25, a private key KR which is known only to the network RR, and the identifier IDTM of the terminal TM are read in the register HLR in response to the variable VA transmitted in step E22, or after the call in step E21. The private key KR and the variable VA received, or instead supplied by the clock, are fed to the cryptography algorithm AC also implemented in the register VLR to supply a network signature SIG in step E26. The register VLR then sends the signature SIG with the identifier IDTM to the terminal TRC in step E27. The terminal TRC compares the received signature SIG with the stored result RES in step E28. If the signature SIG differs from the result RES, the terminal TRC refuses the call in step E29, hanging up automatically, and the switching center MSC sends a clearing down message to the terminal TM.

On the other hand, if the signature SIG and the result RES are identical, the identifier IDTM received in step E27 is compared to mobile terminal identifiers IDUT pre-stored in a programmable table TAB in the receiver terminal TRC in step E30. The identifiers IDUT in the table TAB identify respective terminals authorized to execute certain commands and access certain services provided by the terminal TRC. Also, the table TAB matches to the identity of each authorized predetermined mobile terminal an access capacity CA listing the command or commands that the user of the terminal is authorized to execute.

In step E30, if the received identifier IDTM is not found in the table TAB, the terminal TRC refuses the outgoing call, as in step E29. In the previously cited variant of step E12, refusal of the call by the terminal TRC in step E29 can also be the result of the authentication invalidation transmitted with the identifier IDTM by the register VLR in step E27. Otherwise, in response to the identifier IDTM transmitted, the outgoing call is accepted by the terminal TRC, which signals it to the register VLR, and the switching center MSC sends a connection message to the mobile terminal TM in order to connect the terminals TM and TRC, in step E31. The terminal TM then sends a command COM, for example a command to activate the electronic doorkeeper PE (FIG. 1), which is executed in step E33 by the terminal TRC if the command COM transmitted belongs to the access capacity CA associated with the terminal TM in step E32. Otherwise, the terminal TRC prompts the user UP to resend a command in step E34.

Figure 4:
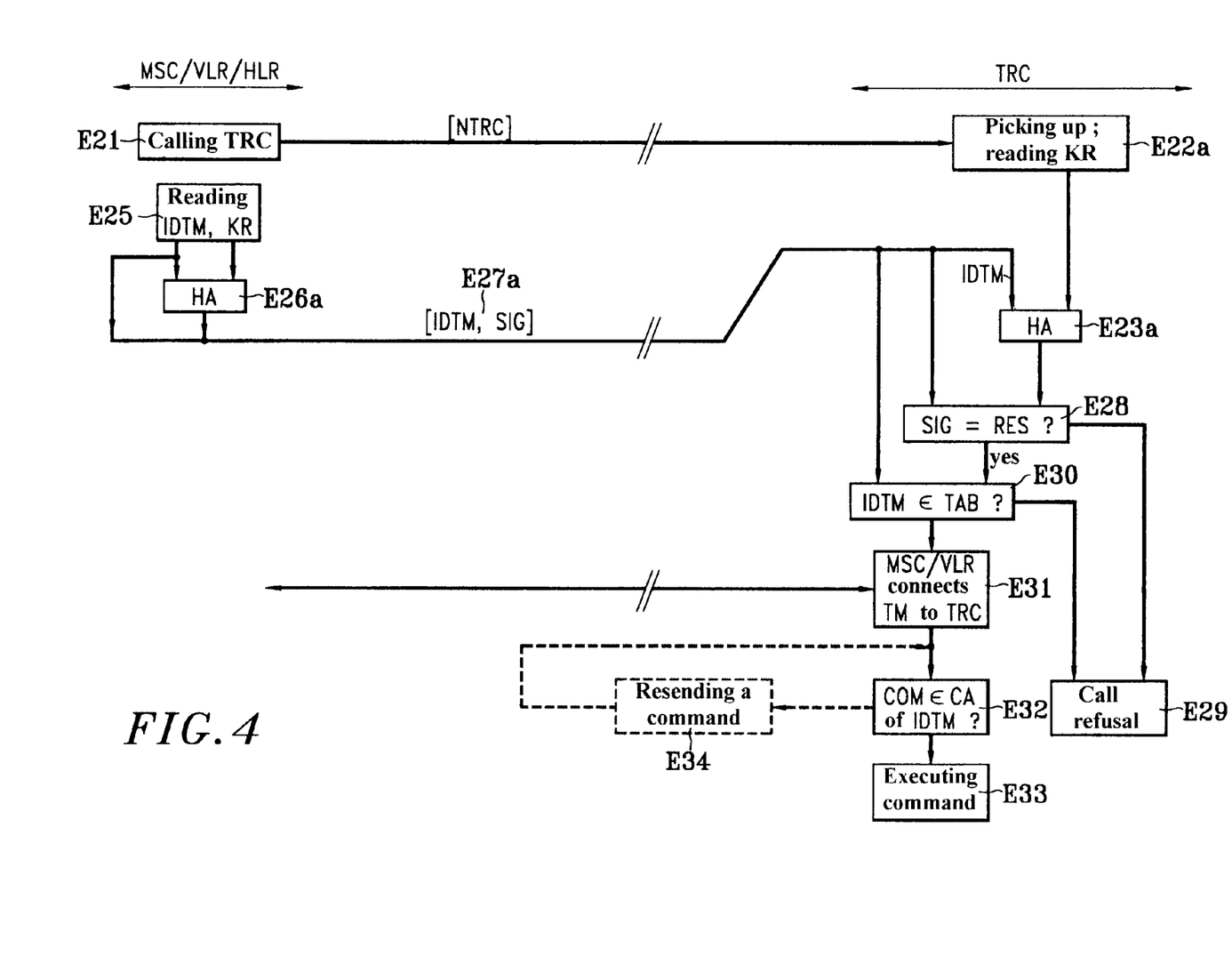
FIG. 4 is a variant of the FIG. 3 algorithm, using security by hashing.

In a further variant shown in FIG. 4, instead of using a random variable VA and an asymmetric authentication algorithm AC employing keys KR and KU, the register VLR first, in a step E26a, feeds the private key KR and the identifier IDTM read in step E25 to a one-way hashing algorithm HA. The hashing algorithm produces a signature SIG which constitutes a message authentication code MAC and which is transmitted with the identifier IDTM in a step E27a. In a step E23a following on from the off-hook and key selection step E22a, the terminal TRC feeds the key KR and the identifier IDTM received to the hashing algorithm HA, which is also implemented in the terminal TRC, to produce a result RES which is compared to the signature SIG received in step E28. The process then continues with steps E30 through E33.

Thus, in accordance with the invention, the user UP can open his house remotely at any time. If delayed, he can trigger opening for a babysitter called shortly beforehand to look after his children.

In the case of moving house, or more generally of a change of ownership of the receiver terminal TRC, the departing proprietor UP replaces the identifier IDTM with the identifier of the new proprietor in the table TAB. The new proprietor can then modify all the access rights in the table TAB, including the identifiers of temporarily authorized users UT and their access rights CA, as described below.

If the proprietor user UP changes mobile terminal, his SIM card is inserted into the new terminal, without the method of the invention being modified, since the SIM card contains the biometric reference RB of the proprietor user.

If authentication of the proprietor user UP is followed by a check on the rights granted to the user UP, as indicated in step E31, rights of access to the commands that can be executed by the receiver terminal TRC can be delegated to a third party user UT.

In a first delegation procedure, the proprietor user UP delegates his rights to the user UT either by handing over his SIM card or by handing over his mobile terminal with his SIM card if the SIM card has previously stored a plurality of biometric references RB corresponding to the biometric prints of a plurality of users. In step E2 (FIG. 2), the print EB sensed by the sensor CB of the terminal TM, or any other terminal containing the SIM card of the user UP, is compared to all of the biometric references, and the result RAB is produced and stored in step E3 only if the greatest of the similarities between the print EB and the biometric references is more than a predetermined threshold.

Figure 5:
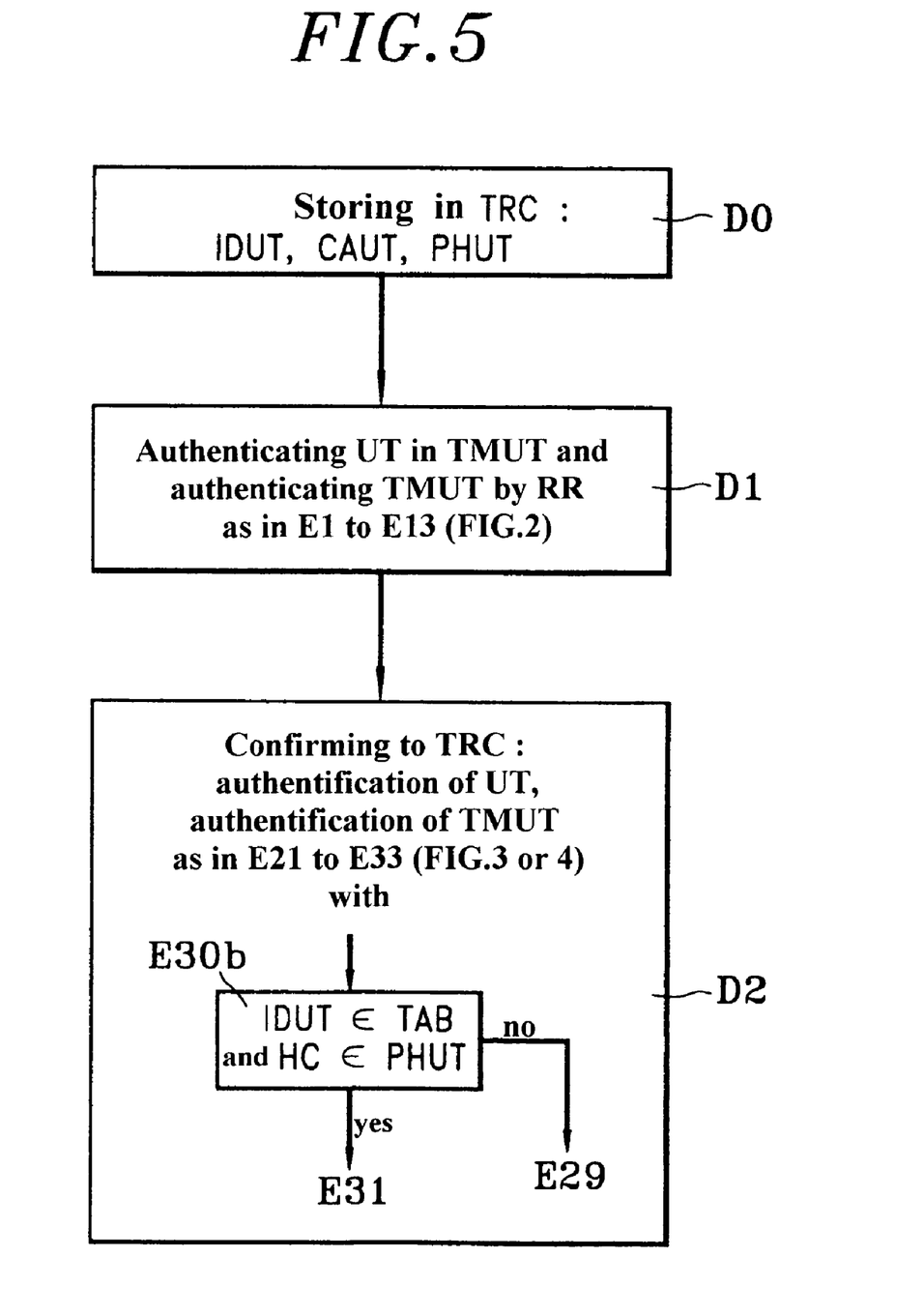
FIG. 5 is an authentication and confirmation algorithm with delegation of rights to delegated user terminals.

In a second delegation procedure, shown in FIG. 5, the proprietor user UP, in an initial step D0, adds the identifier IDUT of the terminal TMUT of at least one delegated user UT to the programmable table TAB, with a respective access capacity CAUT and a respective time period PHUT during which the user UT is authorized to execute commands listed in the capacity CAUT.

Subsequently, the delegated user UT uses his own mobile terminal TMUT to call the receiver terminal TRC, which initiates biometric authentication of the user UT in his mobile terminal TMUT, and authentication of the terminal TMUT by the network in steps D1 analogous to the steps E1 to E13 shown in FIG. 2. Fixed means MSC, VLR, HLR of the radio telephone network RR then confirm the biometric authentication of the user UT and the authentication of the terminal TMUT of the user UT to the receiver terminal TRC in steps D2 analogous to the steps E21 to E33 shown in FIG. 3 or FIG. 4, except for step E30, which is replaced by a more comprehensive step E30b.

In step E30b, the receiver terminal TRC verifies not only that the identifier IDUT of the delegated user UT is listed in the table TAB, but also that the current time HC is within the time period PHUT. If either of these conditions is not satisfied, the call is refused in step E29. On the other hand, if the identifier IDUT was transmitted at a current time HC during the time period PHUT, the receiver terminal TRC accepts the outgoing call from the terminal TMUT which is connected to the terminal TRC in step E31. The fact that each command COM selected by the user UT and transmitted by the terminal TMUT belongs to the access capacity CAUT is then verified in step E32 before the command is executed in step E33.

In a third delegation procedure, the mobile radio telephone terminals TM and TMUT of the proprietor user UP and any delegated user are each equipped with a reader LE of a removable additional card CR, as shown in dashed line in FIG. 1. The card CR is a simple memory card, for example, or a microcontroller card, with or without contacts. The memory in the card CR contains a card identifier IDCR.

Figure 6:
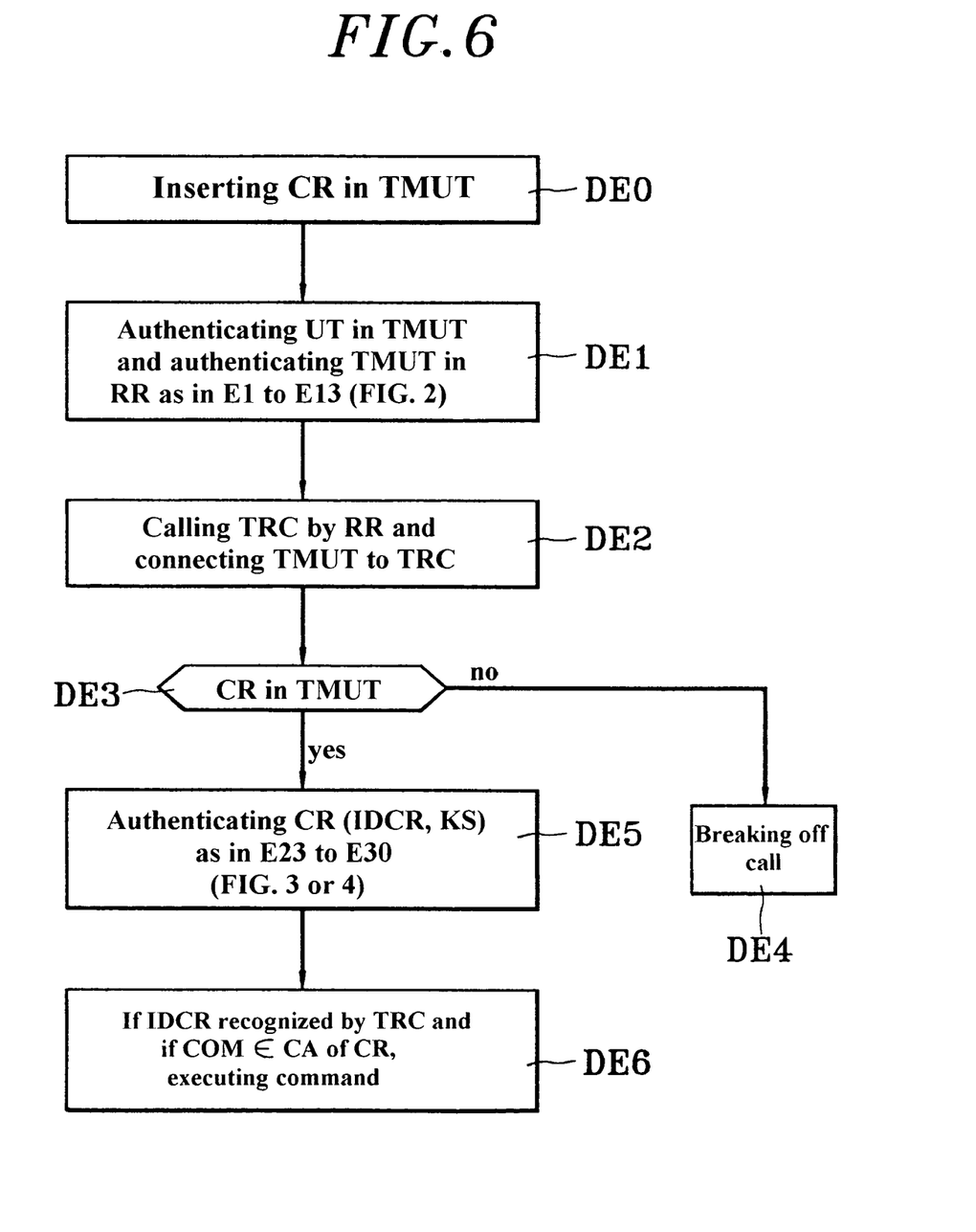
FIG. 6 shows an authentication and confirmation algorithm with delegation of rights by means of additional card.

For this third delegation procedure, the receiver terminal TRC has previously stored the card identifier IDCR instead of the terminal identifier IDTM.

To access a command or service provided by the terminal TRC, any user UT, including the proprietor user UP, inserts the additional card CR into the reader LE of his own mobile terminal TMUT in an initial step DE0 (see FIG. 6). Biometric authentication of the user UT in the terminal TMUT and authentication of the terminal TMUT by fixed means of the network RR are effected in steps DE1 analogous to the steps E1 to E13 shown in FIG. 2.

The switching center MSC to which the terminal TMUT is temporarily connected then calls the receiver terminal TRC and connects the latter to the mobile terminal TMUT via corresponding fixed means of the network RR in a step DE2.

The terminal TRC then interrogates the terminal TMUT to verify if the additional card CR is present in the terminal TMUT in a step DE3. If there is no card CR the terminal TMUT breaks off the call in step DE4.

If the card CR is present in the terminal TMUT, steps DE5 analogous to steps E23 to E30 are executed by the receiver terminal TRC to authenticate the card CR, but between the receiver terminal TRC and the terminal TMUT, instead of the registers VLR and HLR. The terminal identifier IDTM and the key KR are replaced by an identifier IDCR and a secret key KS read in the card CR in step E25, so that in step E27 (FIG. 3) or E27a (FIG. 4) the card identifier IDCR with a signature SIG is transmitted securely by the terminal TMUT to the receiver terminal TRC and in step E30 the card identifier IDCR is looked up in the receiver terminal TRC to identify the terminal TMUT.

If, in step E30 of this third delegation procedure, the card identifier IDCR is recognized by the receiver terminal TRC, and if a command selected by the user UT belongs to the access capacity CA associated with the card CR, the transmitted command COM is executed in step E33, as shown for steps DE6.

The proprietor user UP of the card CR thus requests that the terminal TRC provide the service only if the delegated user UT is in possession of the additional card CR. As soon as the user UP recovers the card CR, he deprives the user UT of the delegated rights, without having to modify immediately the table TAB of access rights. Delegation is therefore managed by handing over the additional card CR to a delegated user, which no longer requires the identifier IDUT of any user in the terminal TRC and thus the making up beforehand of a table TAB of access rights. Any user UT in possession of the card CR receives the rights granted to the proprietor user of the card. Because the additional card CR is removable, it can be used with any mobile terminal.

Because the card CR contains the identifier IDCR and is representative of the access rights of the proprietor user UP of the card vis-à-vis the receiver terminal TRC, theft of the card CR enables fraudulent access to the commands and services offered by the terminal TRC. On the other hand, the person who stole the card and the mobile terminal into which the card is inserted are authenticated. The thief can then be located, which helps to limit abuse of the card CR. A table of events can be drawn up by the telephone operator of the network RR and supplied to the proprietor user UP of the terminal TRC to uncover information on fraudulent use. A "delegated" user therefore obtains no benefit by abusing the card CR.

By handing over his rights by means of the card CR, the user UP has as much freedom as he would have with a physical bunch of keys. The user UP can entrust the right to open his house in his absence to a trustworthy person. Depending on requirements, a plurality of identical cards can be distributed to members of the family of the user UP, like bunches of keys.

If the proprietor of the receiver terminal TRC changes, the rights granted to the card of the departing proprietor are refused if the identifier of the additional card of the new proprietor is not stored in place of the old identifier IDCR in the terminal TRC. Another solution is to transfer the card from the departing proprietor to the new proprietor, just like transferring a bunch of keys.

In the foregoing three delegation procedures, the delegated user UT, to whom access rights are delegated, cannot use a stolen mobile terminal because it will not be recognized during the biometric authentication steps E0-E2. The handing over of rights is useful if the receiver terminal TRC, incorporated in an automobile which is opened by a method according to the invention, for example, is an object shared between the proprietor of the automobile, a mechanic, and a rental company.

The second and third delegation procedures shown in FIGS. 5 and 6 can be combined. The user UP hands over his card CR after previously delegating his rights by modifying the access rights table TAB. The preceding two delegation procedures are thus associated to offer the maximum possibilities to the proprietor user. For security, the addition of a user identifier IDUT to the access rights table TAB is effected remotely from the mobile terminal TM only by the proprietor user UP, and the command to modify the table TAB is authorized only in response to the identifier IDTM of the proprietor user UP, which is transmitted by the fixed means VLR, HLR, AUC of the network, and which is recognized in the manner described for the second delegation. Accordingly, even if the user UP is separated from his card CR, the delegated user UT having the use thereof cannot modify the table of rights defined by the user UP.

Integrating the biometric sensor CB in the mobile terminal TM instead of the command receiver terminal TRC reduces the risk of persons being tempted to try their luck and thus the false acceptance rate FAR. The additional card CR enables rights to be handed over without handing over the mobile terminal TM, and possibly without having to modify the rights table TAB, i.e. prevents the user forgetting to withdraw a right, avoids his unavailability for modifying the rights table, etc. The found or stolen additional card cannot be used like a found or stolen bunch of keys because, according to the invention, the user who has made use of the card, or failing this the mobile terminal that has received the card, can be determined.

Although the invention has been described with reference to a home automation application, it can be used in other application fields.

For example, verification of authentication of the mobile terminal and authentication of the user UP offers an additional level of confidence to a banking organization when an operation is effected remotely. The banking organization then verifies that the mobile terminal from which a transaction has been instructed is that which was declared on subscribing to the banking service and that it is being used by an authorized user and not by a third party who has found the mobile terminal, whether by chance or otherwise. For his part, the user UP does not have to memorize a password to access a service and obtains the full benefit of the ergonomic features introduced by the biometric process steps E0 to E3.

The invention claimed is:

1. A method of setting up an outgoing call from a mobile terminal of a user in a radio telephone network to a second terminal through fixed storage means in said radio telephone network, said method including
biometrically authenticating said user in said mobile terminal thereby producing a result of said biometric authentication,
applying said biometric authentication result and a predetermined result respectively to identical algorithms respectively performed in said mobile terminal and said fixed storage means to authenticate said mobile terminal and thereby produce a signature and a signature result,
transmitting said signature from said mobile terminal to said fixed storage means,
comparing said signature and said signature result in said fixed storage means,
calling from said fixed storage means to said second terminal and transmitting an identifier of said mobile terminal from said fixed storage means to said second terminal only if said signature and said signature result are identical, and
identifying said mobile terminal by said second terminal, said second terminal accepting said outgoing call only in response to said second terminal recognizing said transmitted mobile terminal identifier.

2. A method according to claim 1, wherein said biometric authentication result and said predetermined result are not applied respectively to identical mobile terminal authenticating algorithms in said mobile terminal and said fixed storage means if biometric authentication fails.

3. A method according to claim 1, wherein said biometric authentication is performed after selecting a call number of said second terminal in said mobile terminal.

4. A method according to claim 1, wherein said biometric authentication result, an authentication key stored in said mobile terminal, and a random number transmitted by said fixed storage means to said mobile terminal are fed to said mobile terminal authenticating algorithm in said mobile terminal.

5. A method according to claim 1, wherein said transmission of said mobile terminal identifier is secured by cryptography algorithms using asymmetric keys and performed respectively in said fixed storage means and said second terminal.

6. A method according to claim 5, wherein said cryptography algorithms depend on a random variable transmitted from one of said fixed storage means and second terminal to said other.

7. A method according to claim 5, wherein said cryptography algorithms depend on a random variable generated in said fixed storage means and said second terminal.

8. A method according to claim 1, wherein said transmission of said mobile terminal identifier is secured by cryptography algorithms using symmetrical keys and performed respectively in said fixed storage means and said second terminal.

9. A method according to claim 1, wherein said biometric authentication result is produced only if a print sensed by said mobile terminal and biometric references pre-stored in said mobile terminal have a similarity more than a predetermined threshold.

10. A method according to claim 1, wherein said second terminal includes a table that pre-stores a plurality of identifiers of predetermined mobile terminals and accepts said outgoing call in response to one of said identifiers transmitted by said fixed storage means.

11. A method according to claim 10, wherein said table in said second terminal matches to said identifier of each predetermined mobile terminal an access capacity in order to accept a command transmitted by said predetermined mobile terminal only if said command belongs to said access capacity.

12. A method according to claim 10, wherein said table in said second terminal matches to said identifier of each predetermined mobile terminal a respective time period in order to accept only during said respective time period an outgoing call from said predetermined mobile terminal in response to the transmitted predetermined mobile terminal identifier.

13. A method of setting up an outgoing call from a mobile terminal of a user in a radio telephone network to a second terminal through fixed storage means in said radio telephone network, said method including
inserting a removable additional card into said mobile terminal,
biometrically authenticating said user in said mobile terminal to thereby produce a result of said biometric authentication,
applying said biometric authentication result and a predetermined result respectively to identical algorithms respectively performed in said mobile terminal and said fixed storage means to authenticate said mobile terminal and thereby produce a signature and a signature result,
transmitting the signature from said mobile terminal to said fixed storage means,
comparing said signature and said signature result in said fixed storage means,
calling said second terminal from said fixed storage means and connecting said mobile terminal and said second terminal via said fixed storage means if said signature and said signature result are identical,
verifying, by said second terminal, if said removable additional card is present in said mobile terminal,
transmitting an identifier of said additional card from said mobile terminal to said second terminal in order for said second terminal, and
identifying, by said second terminal, said mobile terminal as a function of said card identifier in order for said second terminal to accept said outgoing call only in response to said second terminal recognizing said transmitted card identifier.

14. A method according to claim 13, wherein access rights in said second terminal are modified only in response to transmission by said fixed storage means of an identifier of a predetermined terminal.

15. A mobile radio telephone terminal of a user in a radio telephone network including, a set up arrangement for setting up an outgoing call, the set up arrangement being arranged for: (a) biometrically authenticating said user for thereby producing a biometric authentication result, (b) causing said network to execute an algorithm for authenticating said mobile terminal, and (c) causing transmission of a signature to said network in response to said algorithm being responsive to (i) said biometric authentication result, (ii) a pre-stored key, and (iii) a random number which is transmitted by said network.

16. A fixed storage means in a radio telephone network including:
- an arrangement for setting up an outgoing call from a mobile terminal of a user in said radio telephone network to a second terminal via said fixed storage means, the arrangement being arranged for:
- (a) executing an algorithm for authenticating said mobile terminal, the algorithm being arranged to produce a predetermined result depending on receipt by the algorithm of (i) a biometric authentication of said user by said mobile terminal, (ii) a pre-stored key and (iii) a random number transmitted by said fixed storage means to said mobile terminal,
- (b) comparing a signature transmitted by said mobile terminal with a signature result produced by said algorithm, and
- (c) calling said second terminal if the comparison indicates said signature and said signature result are identical.

17. A fixed storage means according to claim 16, wherein the setting up arrangement is arranged for transmitting an identifier of said mobile terminal to said second terminal during a call to said second terminal.

18. A second terminal adapted to be called from a mobile terminal of a user requesting to set up an outgoing call via a radio telephone network, the second terminal including a processor arrangement for:
- (a) identifying said mobile terminal as a function of an identifier of said mobile terminal transmitted by fixed storage means included in said radio telephone network, the processor arrangement being arranged for identifying the mobile terminal in response to the second terminal receiving indications of (i) a biometric authentication of said user in said mobile terminal applying biometric authentication result to an algorithm to produce a signature, transmitting signature to fixed storage means and (ii) an authentication of said mobile terminal by said fixed storage means, by comparing signature to a signature result calculated using the same algorithm with a predetermined result and
- (b) accepting said outgoing call only if said transmitted mobile terminal identifier is recognized.

* * * * *